US007764864B2

(12) United States Patent
Jung et al.

(10) Patent No.: US 7,764,864 B2
(45) Date of Patent: *Jul. 27, 2010

(54) INFORMATION STORAGE MEDIUM HAVING MULTI-ANGLE DATA

(75) Inventors: Kil-soo Jung, Gyeonggi-do (KR); Seong-jin Moon, Gyeonggi-do (KR); Jung-wan Ko, Gyeonggi-do (KR); Jung-kwon Heo, Seoul (KR); Sung-wook Park, Seoul (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

This patent is subject to a terminal disclaimer.

(21) Appl. No.: 10/735,819

(22) Filed: Dec. 16, 2003

(65) Prior Publication Data

US 2004/0165862 A1 Aug. 26, 2004

Related U.S. Application Data

(60) Provisional application No. 60/452,550, filed on Mar. 7, 2003.

(30) Foreign Application Priority Data

Dec. 16, 2002 (KR) ..................... 10-2002-0080484

(51) Int. Cl.
*H04N 5/91* (2006.01)

(52) U.S. Cl. ....................................................... 386/68

(58) Field of Classification Search .................. 386/96, 386/95, 125, 83, 46, 68
See application file for complete search history.

(56) References Cited

U.S. PATENT DOCUMENTS

| | | | | |
|---|---|---|---|---|
| 5,784,528 | A | 7/1998 | Yamane et al. | |
| 5,870,523 | A * | 2/1999 | Kikuchi et al. | 386/95 |
| 5,999,698 | A * | 12/1999 | Nakai et al. | 386/125 |
| 6,031,962 | A * | 2/2000 | Sawabe et al. | 386/96 |
| 6,049,654 | A * | 4/2000 | Furuta et al. | 386/95 |
| 2003/0113096 | A1 * | 6/2003 | Taira et al. | 386/46 |

FOREIGN PATENT DOCUMENTS

| | | |
|---|---|---|
| CN | 1310445 | 8/2001 |

(Continued)

OTHER PUBLICATIONS

U.S. Appl. No. 11/429,969, filed May 9, 2006, Kil-soo Jung et al., Samsung Electronics Co., Ltd.

(Continued)

*Primary Examiner*—Thai Tran
*Assistant Examiner*—Tat Chio
(74) *Attorney, Agent, or Firm*—NSIP Law

(57) ABSTRACT

An information storage medium which stores data structures supporting multi-angles includes clip AV streams for respective angle data of multi-angle motion picture data. As additional information for each clip AV stream, clip information is recorded on a separate storage area from that of the clip AV streams. The clip information includes jumping-point information for jumping into another angle. Each of the clip AV streams may be recorded in a contiguous recording area, or divided into smaller interleaved units that are interleaved with units of the other clip AV streams.

8 Claims, 11 Drawing Sheets

| Volume and File Structure | DVD-Video Zone | | | |
|---|---|---|---|---|
| VMG | VTS #1 | VTS #2 | ... | VTS #n |
| File ... | File ... | File ... | File ... | File ... |
| 2~3 | 3~12 | | | |

FOREIGN PATENT DOCUMENTS

| | | |
|---|---|---|
| EP | 0 798 722 | 10/1997 |
| EP | 0 847 198 | 6/1998 |
| JP | 11-110950 | 4/1999 |
| JP | 11-341443 | 12/1999 |
| JP | 2000-298918 | 10/2000 |
| JP | 2002-216460 | 8/2002 |
| JP | 2002-313066 | 10/2002 |
| KR | 1999-63900 | 7/1999 |
| KR | 2001-103983 | 11/2001 |
| KR | 2001-0107578 | 12/2001 |
| RU | 2 309 467 | 8/2005 |

OTHER PUBLICATIONS

U.S. Appl. No. 11/432,479, filed May 12, 2006, Kil-soo Jung et al., Samsung Electronics Co., Ltd.

U.S. Appl. No. 11/430,167, filed May 9, 2006, Kil-soo Jung et al., Samsung Electronics Co., Ltd.

U.S. Appl. No. 11/429,970, filed May 9, 2006, Kil-soo Jung et al., Samsung Electronics Co., Ltd.

U.S. Appl. No. 11/430,166, filed May 9, 2006, Kil-soo Jung et al., Samsung Electronics Co., Ltd.

Office Action issued in Korean Patent Application No. 2002-80484 on Feb. 28, 2006.

U.S. Appl. No. 10/735,823, filed Dec. 12, 2003, Kil-soo Jung et al., Samsung Electronics Co., Ltd.

U.S. Appl. No. 10/735,850, filed Dec. 16, 2003, Kil-soo Jung et al., Samsung Electronics Co., Ltd.

Office Action issued in corresponding Malaysian Patent Application No. PI 20034832 dated Aug. 1, 2007.

Office Action issued by Chinese Patent Office in Chinese Patent Application No. 20080106294.6 on Nov. 30, 2007.

Office Action issued by Russian Patent Office in Russian Patent Application No. 2005122460 on Nov. 14, 2007.

Written Opinion issued by the Australian Patent Office on Mar. 18, 2009.

European Office Action issued on Feb. 1, 2010, in corresponding European Application No. 03 777 443.7 (8 pages).

* cited by examiner

FIG. 9

| SML_AGL_C1_DSTA(Address and size of destination ILVU in AGL_C1) |
|---|
| SML_AGL_C2_DSTA(Address and size of destination ILVU in AGL_C2) |
| SML_AGL_C3_DSTA(Address and size of destination ILVU in AGL_C3) |
| SML_AGL_C4_DSTA(Address and size of destination ILVU in AGL_C4) |
| SML_AGL_C5_DSTA(Address and size of destination ILVU in AGL_C5) |
| SML_AGL_C6_DSTA(Address and size of destination ILVU in AGL_C6) |
| SML_AGL_C7_DSTA(Address and size of destination ILVU in AGL_C7) |
| SML_AGL_C8_DSTA(Address and size of destination ILVU in AGL_C8) |
| SML_AGL_C9_DSTA(Address and size of destination ILVU in AGL_C9) |

FIG. 10

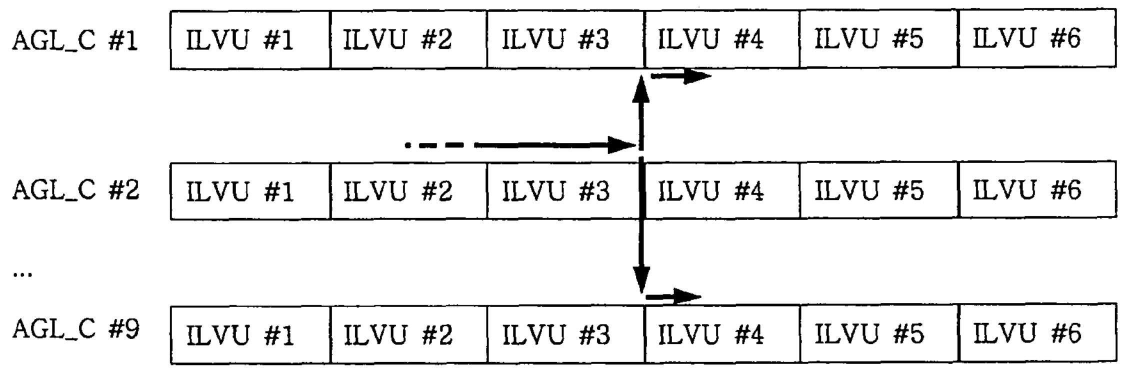

FIG. 11

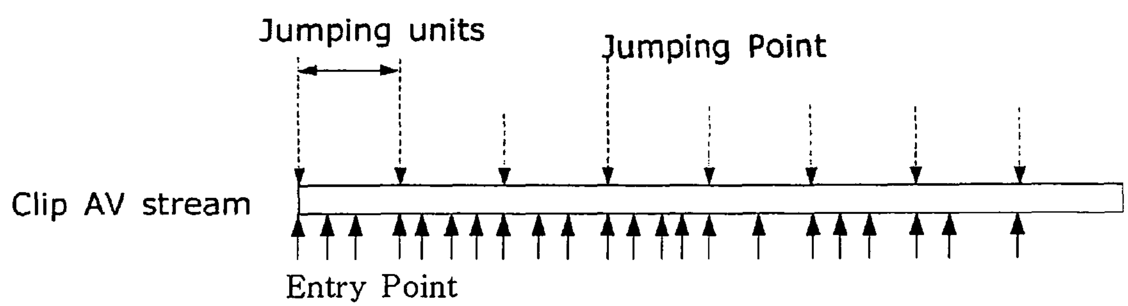

INFORMATION STORAGE MEDIUM HAVING MULTI-ANGLE DATA

CROSS-REFERENCE TO RELATED APPLICATION

This application claims the priority of Korean Patent Application No. 2002-80484, filed on Dec. 16, 2002, in the Korean Intellectual Property Office, and claims the priority of U.S. Patent Application No. 60/452,550, filed on Mar. 7, 2003, in the U.S. Patent and Trademark Office, the disclosures of which are incorporated herein by reference.

BACKGROUND OF THE INVENTION

1. Field of the Invention

Apparatuses and methods consistent with the present invention relate to an information storage medium and multi-angle data structures.

2. Description of the Related Art

For example, DVDs are information storage media capable of storing multi-angle data. Multi-angle data is recorded on a DVD using an interleaving method in which data to be recorded is divided into predetermined units and recorded in turns. Information for seeking and reproducing interleaved blocks is recorded in motion picture bit-streams.

FIG. 1 shows a data structure of a conventional DVD. Referring to FIG. 1, a DVD storage area includes a VMG area, wherein title information and title menu information are stored, and a plurality of VTS areas, wherein a plurality of movie files are stored. Generally, the VMG area includes two or three files and each VTS area includes three through twelve files. The VTS area may include information for a title as a reproduction unit and a VOBS as motion picture information. A plurality of titles can be stored in one VTS.

FIG. 2 shows a data structure of the VMG area of FIG. 1. The VMG area includes a VMGI area which stores additional information related to the VMG area, a VOBS area which stores video objects for menu, and a backup area of VMGI. Each area exists as one file, and the VOBS area may be omitted in some cases.

FIG. 3 shows a data structure of the VTS area of FIG. 1. The VTS area includes Video Title Set Information (VTSI), a VOBS as motion picture data for menu picture, a VOBS as motion picture information for video title set, and backup data of VTSI. A VOBS for displaying a menu picture can be included selectively in the VTS area. Each VOBS is subdivided into VOBs and cells as recording units. One VOB comprises a plurality of cells. The smallest recording unit may be referred to as a cell.

In the DVD, each layer is a reproduction unit and a title is provided in a top layer. The title is connected with one or more PGCs. A PGC among the plurality of PGCs to be first reproduced is called Entry PGC. A title may comprise only one PGC, that is, an Entry PGC. A title may comprise a plurality of PGCs. In such a case, where reproduction of one PGC is complete, another PGC among the plurality of PGCs may be selected and reproduced, and information on a reproduction sequence of a PGC may be stored as a command in the DVD. A control of such a reproduction sequence may be referred to as Navigation. The command deciding the reproduction sequence may be stored in a PGCI.

FIG. 4 shows a data structure of a PGC of the DVD. Referring to FIG. 4, the PGC is stored as an information structure such as a PGCI. The PGCI comprises a pre-command which stores a navigation command, a post-command, and a plurality of program information. The pre-command is a command performed before reproduction of a corresponding PGC, and the post-command is a command performed after reproduction of a corresponding PGC. Each program is composed of a plurality of cell information. These cells are connected on a one-to-one basis to cells in a VOB as recording units. Each cell has a cell command performed after reproduction of the cell is completed. The PGCI information describes a PGC as a recording unit hierarchically. The PGCI information has an information structure to connect a cell as a lowest reproduction unit to a cell as a lowest recording unit. In the PGC, a plurality of cells as recording units are interconnected, and the plurality of cells form one angle block.

FIG. 5 shows an example of an angle block comprising a plurality of cells arranged in parallel. Upon reproduction, one cell in the angle block is selected and reproduced. The plurality of cells forming the angle block have the same reproduction time and each cell corresponds to angle data in the angle block, angle data divided into interleaved units (ILVUs) as predetermined units are interleaved with each other and recorded to VOBs and Cells as recording units.

FIG. 6 shows VOBs and Cells as recording units in a case of not including multi-angle data. Referring to FIG. 6, each VOB is stored in a continuous block of a contiguous recording space of the information storage medium. In the case of multi-angle data, as shown in FIG. 7, VOBs, each of which corresponds to angle data, and the Cells, as lower units thereof, are recorded as an interleaved block, in which ILVU units are interleaved. Accordingly, one angle data is not stored within a contiguous recording area, and each angle data is interleaved and recorded in a predetermined order.

FIG. 7 shows an arrangement in which two angle data are interleaved and recorded in order. As shown in FIG. 7, each ILVU should have a same reproduction time. A size of a recording length of data may be changed according to data compressibility. To reproduce interleaved data, jumping of the ILVU data unit is required in both cases where one angle data is reproduced, and where one angle data is changed from another angle data and then reproduced. For example, to reproduce data corresponding to angle 1, it is required to seek and reproduce only ILVU data corresponding to the angle 1. To change to another angle data while angle data is reproduced, jumping to a specific location corresponding to the changed angle data should be performed. At this time, the jumping location is also decided based on the ILVU unit.

Location information for an ILVU unit of a corresponding angle and for another ILVU unit of another angle connected to the corresponding angle is recorded in motion picture bit-streams. As shown in FIG. 8, a VOBS as a motion picture bit-stream has a layered structure, and a lowest layer comprises PCKs (PACKs) such as a NV_PCK, A_PCK, V_PCK, and SP_PCK. The NV_PCK is referred to as a navigation pack, and as shown in FIG. 9, stores location and size information SML_AGL_Cn_DSTA of ILVU data for a maximum of nine angles supported by the DVD. These are information for seeking ILVU data for angle n connected to the ILVU data currently being reproduced. After reproducing the present ILVU data, angle change into a desired angle may be performed using this information to reproduce ILVU data for the desired angle. Such location information of ILVU data is multiplexed and recorded in bit-streams of interleaved and recorded motion picture data.

FIG. 10 illustrates jumping into selected angles, in a reproduction order. Referring to FIG. 10, to perform a seamless change to reproduce motion pictures, where an angle change command from a user is received at a specific location, jumping into ILVU data of the desired angle is generated after the reproduction of present ILUV data, and reproduction of the ILVU data of the desired angle is performed.

A conventional authoring process of the DVD for multi-angle data is described below. First, images taken from various angles are compressed respectively and bit-streams having the same reproduction length are created. The bit-streams are interleaved and each bit-stream includes information capable of referring to different angles so as to allow an angle change in the midst of reproduction.

Information related to interleaving is multiplexed and recorded in a motion picture data stream, and therefore is extracted. Generally, an operation to seek and reproduce an interleaved block belonging to an angle, or to change to and thereafter seek and reproduce an interleaved block corresponding to another angle, is processed through software by a CPU of a reproduction apparatus. This software accesses the interleaved block currently being reproduced, obtains location information on a desired interleaved block to be reproduced, and transfers the obtained location information to a data reading device. Also, compressed and encoded motion picture data is processed in a motion picture demultiplexer. Accordingly, a process for extracting location information from motion picture data and transferring the location information to the CPU is needed.

Furthermore, where multi-angle data is divided into predetermined units, interleaved, and stored, reproduction location change is continuously required in order to read data successively, as the corresponding data is not recorded successively even in a case where one angle data is reproduced successively. Also, a problem exists in that even though a considerable time for location change may be needed with respect to, for example, optical disks or hard disks, bit-rate of compressed bit-streams to compensate for this time is limited.

SUMMARY OF THE INVENTION

Accordingly, it is an aspect of the present invention to provide an information storage medium having a data structure capable of removing storage location limitation of multi-angle data and allowing random access of the multi-angle data.

Another aspect of the present invention is to provide an information storage medium comprising information on jumping-points for a successive reproduction and angle change of multi-angle data, on a separate storage area from that of motion picture data.

Still another aspect of the present invention is to provide an information storage medium comprising information on jumping-points for a successive reproduction and angle change of multi-angle data integrated with information for random access supported by motion picture data.

Additional aspects and/or advantages of the present invention will be set forth in part in the description which follows and, in part, will be obvious from the description, or may be learned by practice of the invention.

To achieve the above and/or other aspects of the present invention, there is provided an information storage medium for storing multi-angle motion picture data thereon, comprising motion picture data for different angles which are interleaved with respect to each other, wherein motion picture data for each angle has a plurality of access points through which motion picture data for another angle is connectedly and successively reproduced, and information on the access points provided in a separate area from that of the interleaved motion picture data.

The access points may correspond to boundaries of interleaved units of the interleaved motion picture data.

The medium may further comprise characteristic information corresponding to the motion picture data for different angles, the characteristic information comprising the information on the access points.

To achieve the above and/or other aspects of the present invention, there is provided another information storage medium for storing multi-angle motion picture data thereon, comprising motion picture data for different angles which are divided and interleaved with respect to each other in interleaved units, and information for accessing from an interleaved unit of motion picture data for an angle to a next interleaved unit of the motion picture data for the angle and/or for accessing from an interleaved unit of motion picture data for an angle to a corresponding next interleaved unit of motion picture data for another angle, provided in a separate area from that of the interleaved motion picture data.

The medium may further comprise characteristic information corresponding to the motion picture data for different angles, the characteristic information comprising the information on the access points.

To achieve the above and/or other aspects of the present invention, there is provided still another information storage medium for storing multi-angle motion picture data corresponding to a motion picture, comprising clip audio-video (AV) streams corresponding to motion picture data for different angles, which are interleaved with respect to each other, and information on jumping-points of the clip AV streams provided in a separate area from that of the interleaved clip AV streams, wherein the jumping-points are access points through which the motion picture is reproduced from one angle to another angle.

The jumping-points may correspond to boundaries defining units of the interleaved clip AV streams.

The medium may further comprise a plurality of clip information corresponding to the clip AV streams, which comprise the information on the jumping-points. Each of the clip information may comprise an entry point map comprising information on entry points of a corresponding one of the clip AV streams for random access, and information on whether each of the entry points is a jumping-point.

The medium may further comprise playlist information which comprises at least one playitem that corresponds to the clip AV streams.

The medium may further comprise playlist information which comprises at least one playitem having angle block information, wherein the angle block information comprises information on whether the playitem is for the motion picture data for different angles. The angle block information may further comprise information on the number of different angles for the motion picture.

To achieve the above and/or other aspects of the present invention, there is provided yet another information storage medium for storing multi-angle motion picture data corresponding to a motion picture, comprising a clip audio-video (AV) stream corresponding to motion picture data for different angles which are interleaved with respect to each other, and information on jumping-points of the clip AV stream provided in a separate area from that of the clip AV stream, wherein the jumping-points are access points through which the motion picture is reproduced from one angle to another angle.

The medium may further comprise clip information corresponding to the clip AV stream, which comprises the information on the jumping-points. The information on the jumping-points may comprise location information corresponding to a start location to each jumping-point, for the clip AV stream.

To achieve the above and/or other aspects of the present invention, there is provided still yet another information storage medium for storing multi-angle motion picture data corresponding to a motion picture, comprising clip audio-video (AV) streams corresponding to motion picture data for different angles, which are interleaved with respect to each other, and a plurality of clip information corresponding to the clip AV streams provided in a separate area from that of the interleaved clip AV streams, wherein each clip information comprises an entry point map comprising information on entry points for random access and information on whether each of the entry points is a jumping-point, wherein the jumping-point is an access point through which the motion picture is reproduced from one angle to another angle.

BRIEF DESCRIPTION OF THE DRAWINGS

These and/or other aspects and advantages of the invention will become apparent and more readily appreciated from the following description of the aspects of the present invention, taken in conjunction with the accompanying drawings of which:

FIG. 9 is a block diagram illustrating an information structure for reproducing multi-angle data, recorded on a NV_PCK;

FIG. 10 is a block diagram illustrating a jumping operation with respect to selected angles, in a reproduction order;

FIG. 11 is a view showing a location relationship among jumping-units, jumping-points, and entry-points to illustrate an aspect of the present invention;

DETAILED DESCRIPTION OF THE INVENTION

Figure 1:
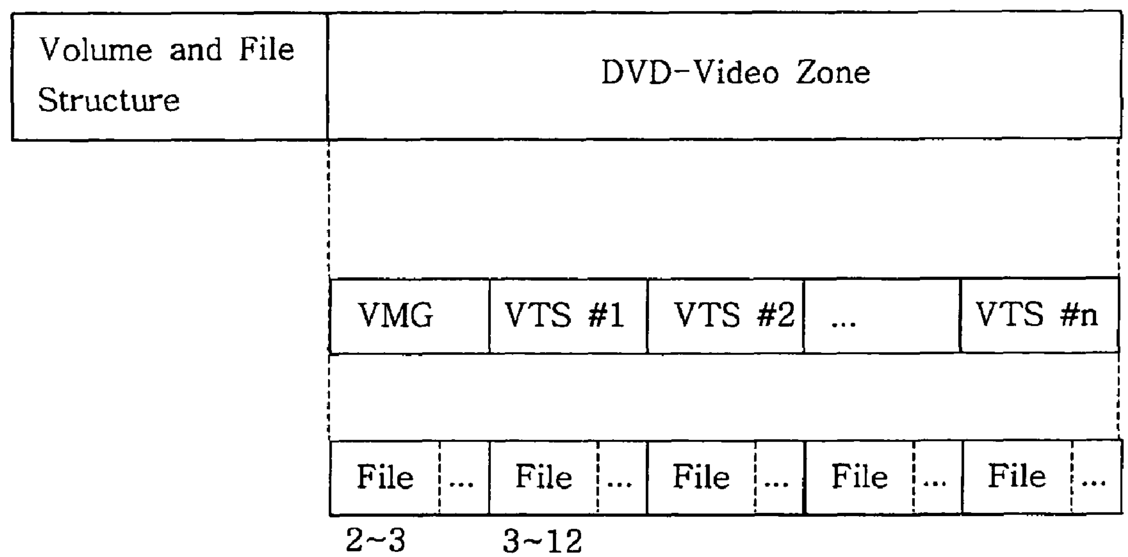
FIG. 1 is a block diagram illustrating a data structure of a DVD.
Figure 2:
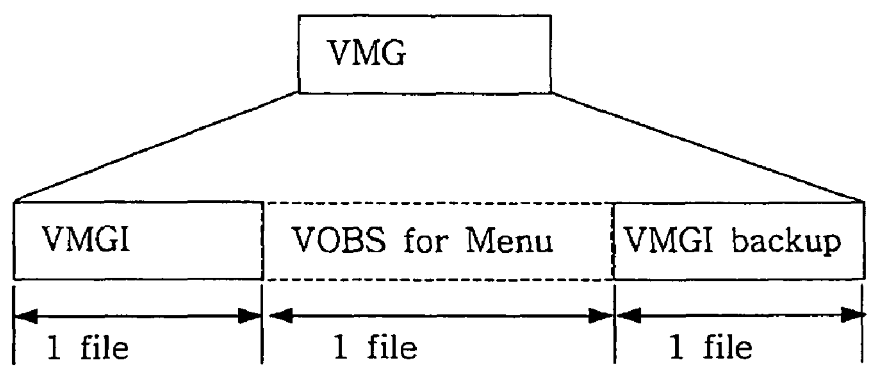
FIG. 2 is a block diagram illustrating a data structure of a VMG area of FIG. 1.
Figure 3:
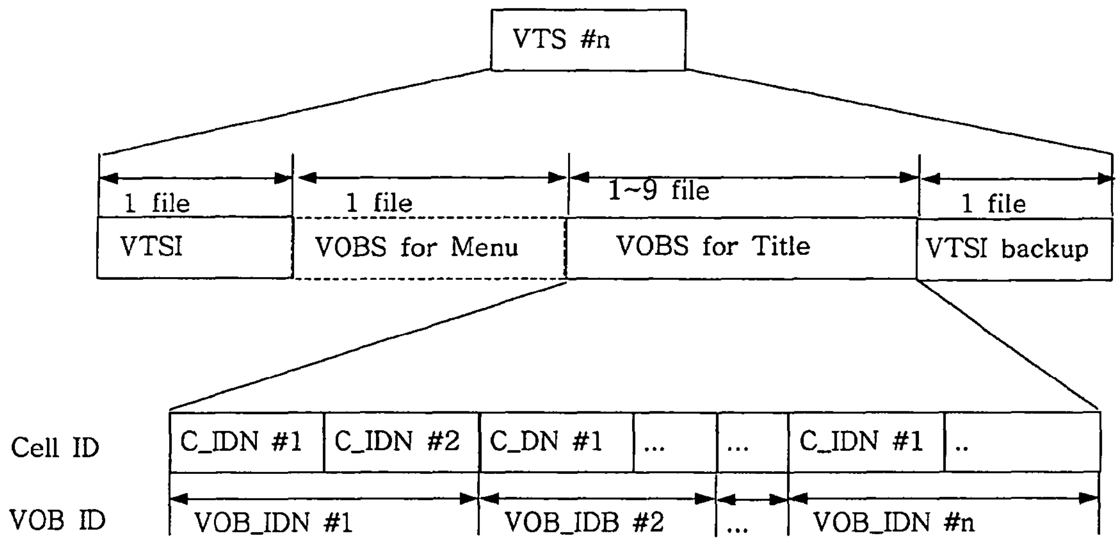
FIG. 3 is a block diagram illustrating a data structure of a VTS area of FIG. 1.
Figure 4:
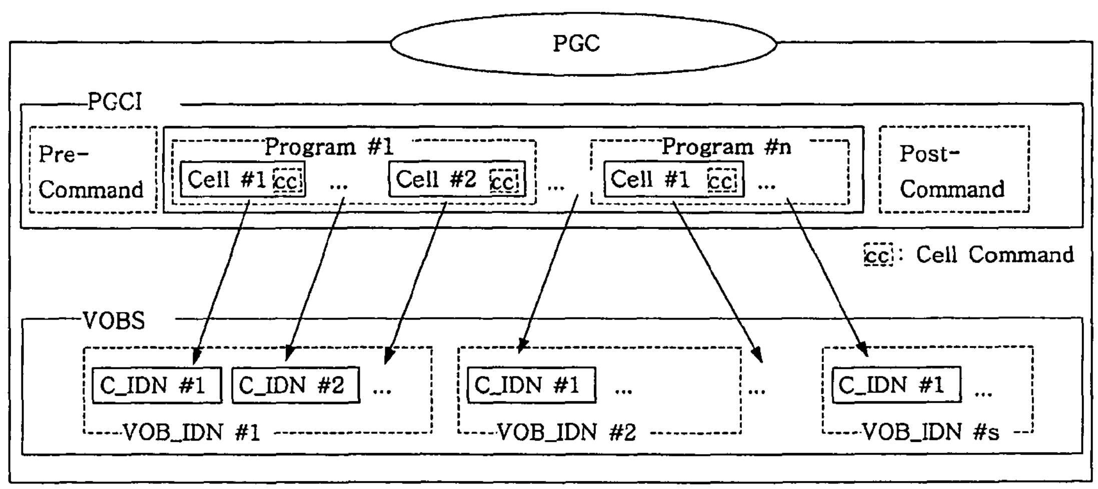
FIG. 4 is a block diagram illustrating a data structure of a PGC of the DVD.
Figure 5:
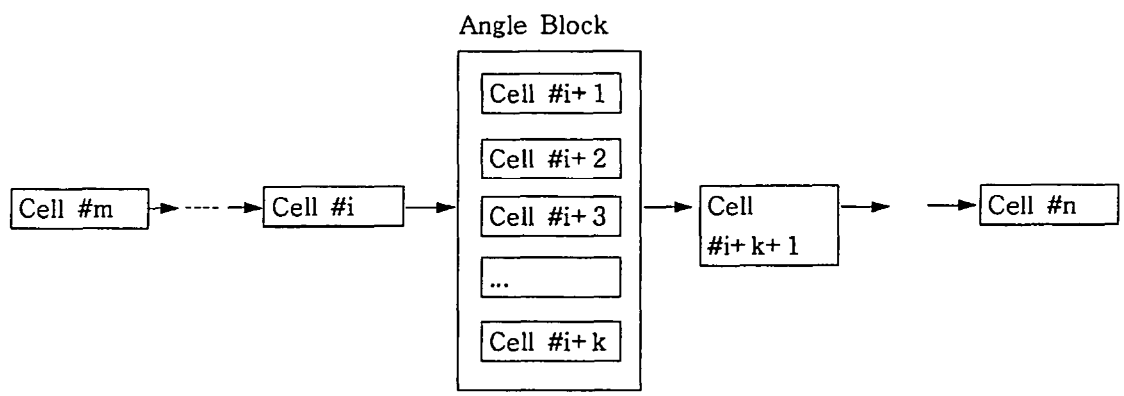
FIG. 5 is a block diagram illustrating a construction of an angle block.
Figure 6:
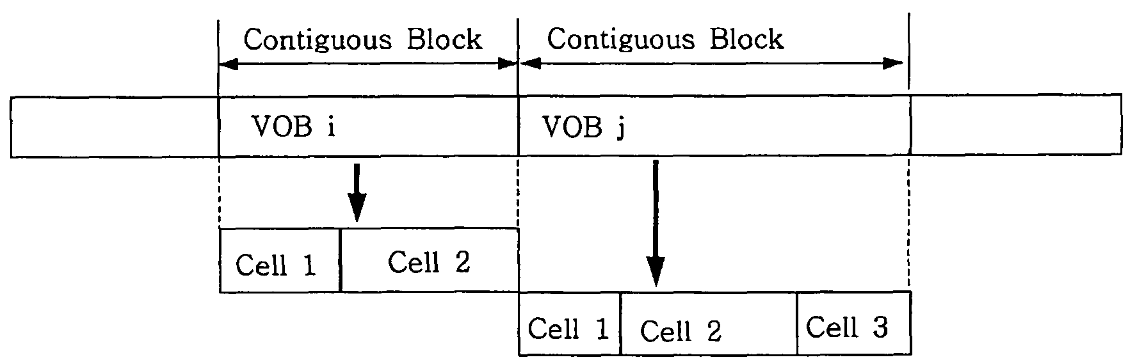
FIG. 6 is a block diagram illustrating VOBs and Cells as recording units in a case of not including multi-angle data.
Figure 7:
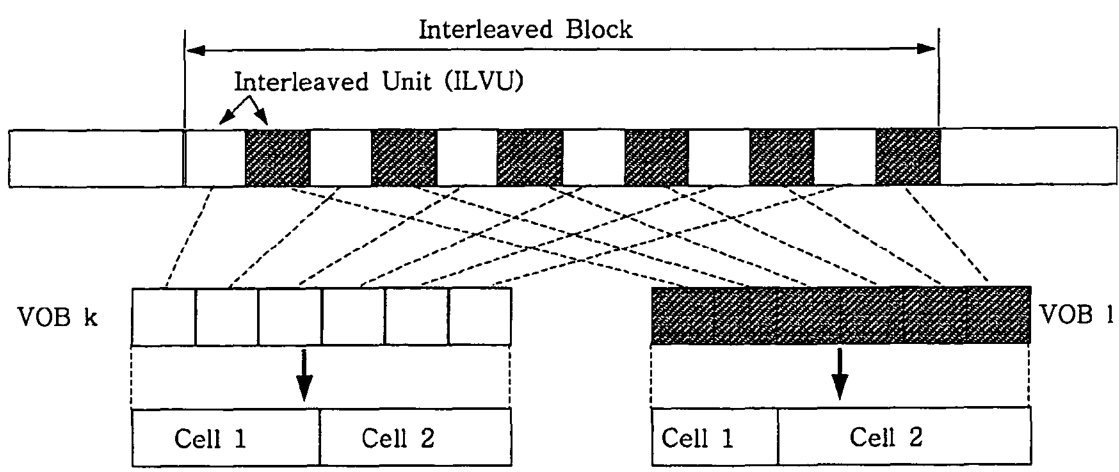
FIG. 7 is a block diagram illustrating two angle data which are interleaved and recorded in order.
Figure 8:
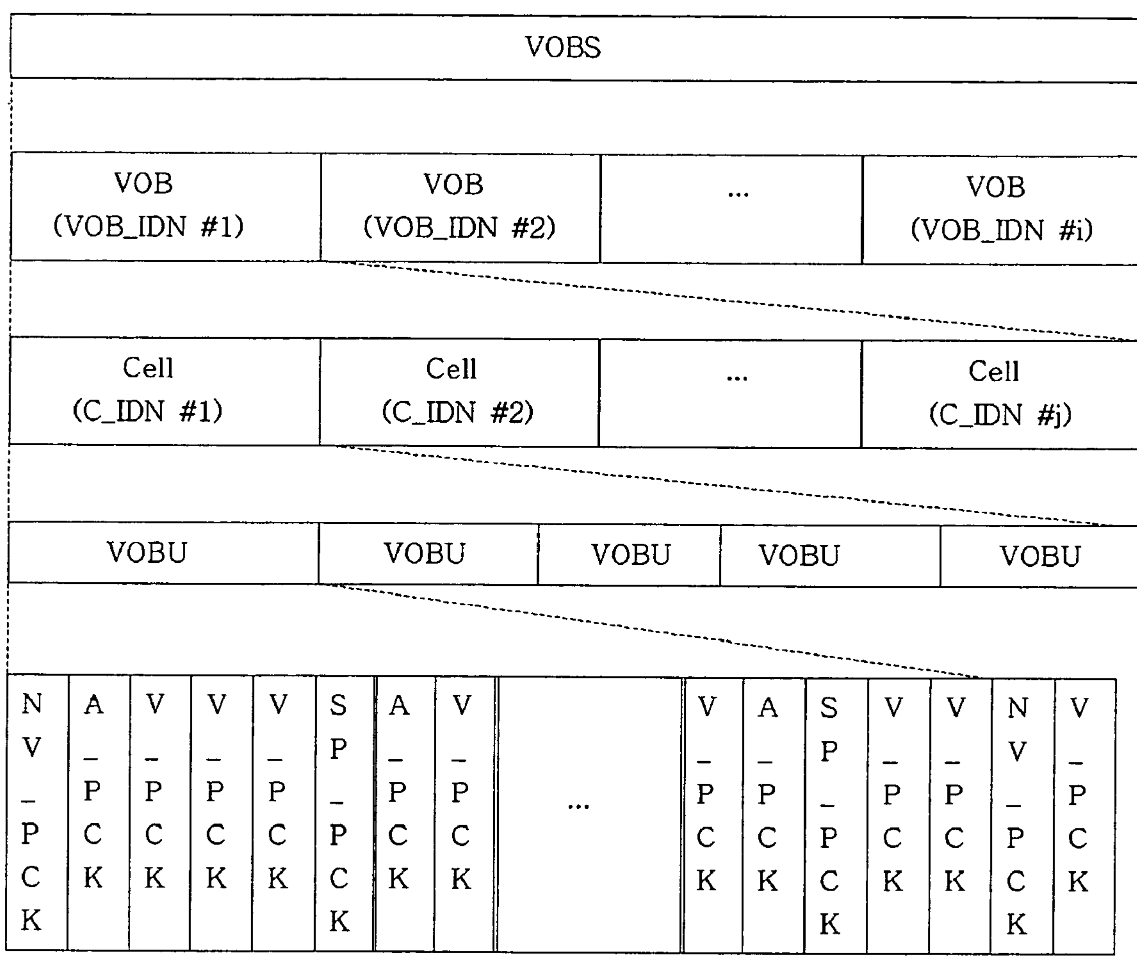
FIG. 8 is a block diagram illustrating a detailed layer of a motion picture bit-stream.

Reference will now be made in detail to the embodiments of the present invention, examples of which are illustrated in the accompanying drawings, wherein like reference numerals refer to like elements throughout. The embodiments are described below in order to explain the present invention by referring to the figures.

According to an embodiment of the present invention, there is provided a medium in which information on jumping-points to reproduce each angle data and/or reproduce another angle data in the midst of reproducing initial angle data is recorded in a separate storage area of the medium from that of multi-angle motion picture data. According to an aspect of the present invention, motion picture data for an angle may be stored as a clip audio-video (AV) stream, and clip AV streams for different angles may be individually divided into smaller interleaved blocks and interleaved with each other. According to another aspect, each angle data may be recorded using a division recording method. Jumping-point information for seeking motion picture data for each angle is stored in a separate storage area from that of the motion picture data. That is, information for referring to different angles is provided in a separate area from that of the clip AV streams.

To change from one angle to another angle according to an aspect of the present invention, angle data are classified into corresponding jumping-units (JPUs), a start address of each jumping-unit is designated as a jumping point, and information on the jumping point is recorded as separate additional information. In a case where one angle data is divided into interleaved blocks and interleaved with another angle data, the interleaved blocks may act as the jumping-units.

To perform the operation described above, an embodiment of the present invention may comprise the following components:

(1) compressed and encoded clip audio-visual (AV) streams for respective angles;

(2) clip information file having information such as encoding attribute information for a clip AV stream;

(3) PlayItem for setting time according to a reproduction interval between IN-time and OUT-time of a clip;

(4) PlayList comprising one or more PlayItems; and (5) jumping-point map which stores locations of jumping-points.

Multi-angle data refers to motion picture data comprising a plurality of reproduction units at a specific time-point. That is, the multi-angle data is motion picture data that are photographed simultaneously using a plurality of cameras at a specific time-point, each camera, for example, representing a view from a different angle. Audio data may be common for each angle or be created differently for each angle. Motion picture data capable of being reproduced at a same time-band are referred to as multi-angle data and contents created using the multi-angle data are referred to as multi-angle contents.

Since the motion picture data is very large in size, the motion picture data is compressed and stored/transmitted as compressed bit-streams. As an illustration, a clip may correspond to a recording unit, and PlayList and PlayItem correspond to reproduction units. The clip may correspond to a cell as a recording unit of, for example, a DVD, and the PlayList and PlayItem correspond to a program and cell as reproduction units of the DVD. An object comprising a clip AV stream and clip information may be referred to as a clip, and a PlayItem may cover a part of or the whole clip. Further descriptions thereof are provided below.

An information recording medium according to an embodiment of the present invention stores AV streams, that is, clip AV streams, as clips. A clip AV stream may be divided into interleaved blocks to be interleaved, or recorded in a contiguous storage area. Each AV stream is compressed and recorded to reduce its size. To reproduce the recorded clip AV streams, characteristic information of the compressed motion picture data is needed. For this reason, clip information is provided for each clip AV stream. The clip information comprises audio and video attributes for each clip AV stream, and an Entry Point Map that stores location information of entry-points allowing random access per predetermined intervals. In MPEG that is utilized generally as motion picture compression standards, the entry-points correspond to the locations of I-pictures to which intra-images are compressed. For example, the Entry Point Map is utilized in time-seeking for seeking a predetermined time-elapsed point after reproduction starts.

FIG. 11 shows a location relationship among jumping-units, jumping-points, and entry-points on a clip AV stream to illustrate an aspect of the present invention. As shown in FIG. 11, where the clip AV stream is motion picture data corresponding to one angle data among multi-angle data, the clip AV stream is divided into a plurality of jumping-units. Each start-point of each jumping-unit is a jumping-point. A jumping-point may be a location of a clip AV stream from which it is jumped out-of to reproduce another clip AV stream corresponding to motion picture data having a different angle in the midst of reproducing the clip AV stream, or a location of a clip AV stream being jumped into in the midst of reproducing another clip AV stream. A jumping-point may be identical to an entry-point. According to an aspect, since the entry-points exist, for example, per about 0.5 second time-intervals, all entry-points may not be used as jumping-points in seamless reproduction. As shown in FIG. 11, one jumping-unit may include a plurality of entry-points. A jumping-point may indicate a first entry-point among the plurality of entry-points within the jumping-unit.

Figure 12:
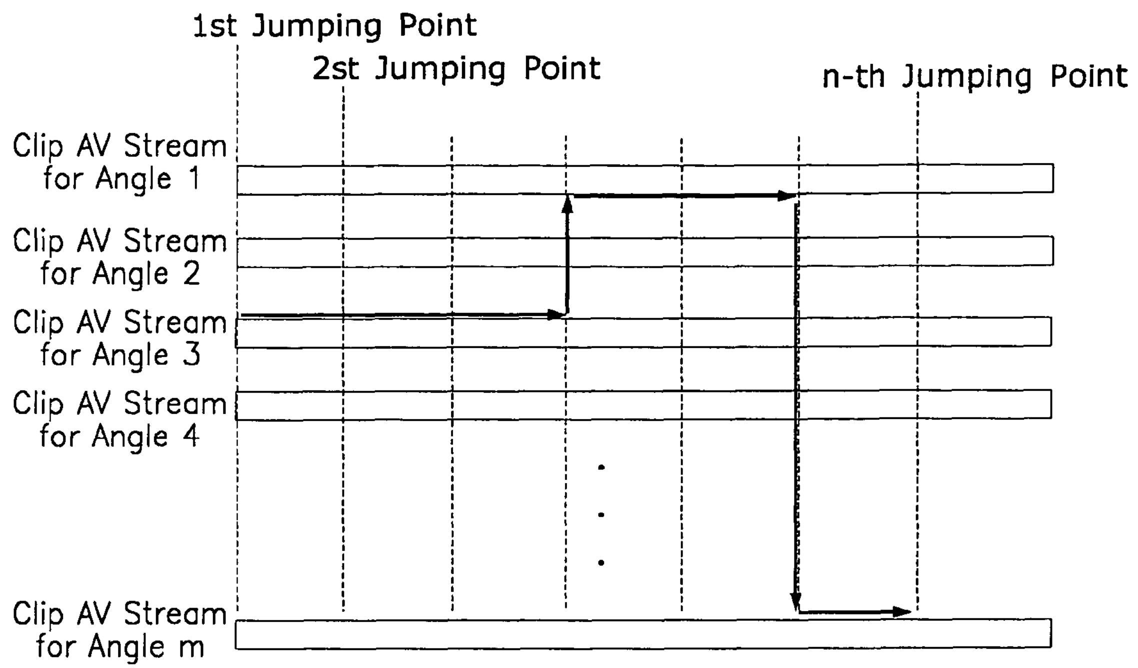
FIG. 12 is a view for describing a method in which respective clip AV streams are recorded in a contiguous storage area to illustrate an aspect of the present invention.

FIG. 12 shows a data structure of a plurality of clip AV streams for multi-angle data, wherein the clip AV streams are not interleaved, to illustrate an aspect of the present invention. As shown in FIG. 12, the respective clip AV streams are recorded individually in a contiguous recording area, where each clip AV stream corresponds to a different angle. The clip AV streams have the same number of jumping-points, and are interconnected virtually. That is, clip AV streams are divided and recorded individually in a continuous storage area, but connected to each other at jumping-points as locations indicating a same reproduction time-point. Accordingly, in the case of reproducing another clip AV stream in the midst of reproducing a current clip AV stream, successive reproduction can be performed by seeking a jumping point of a next jumping unit and reproducing the next jumping-unit of the another clip AV stream, after terminating the reproduction of a jumping-unit of the current clip AV stream. FIG. 12 illustrates a reproduction sequence, where angle 3 is reproduced, then angle 1 is reproduced, and successively, angle m is reproduced. A user input for an angle change may be processed on the basis of jumping-units.

Figure 13:
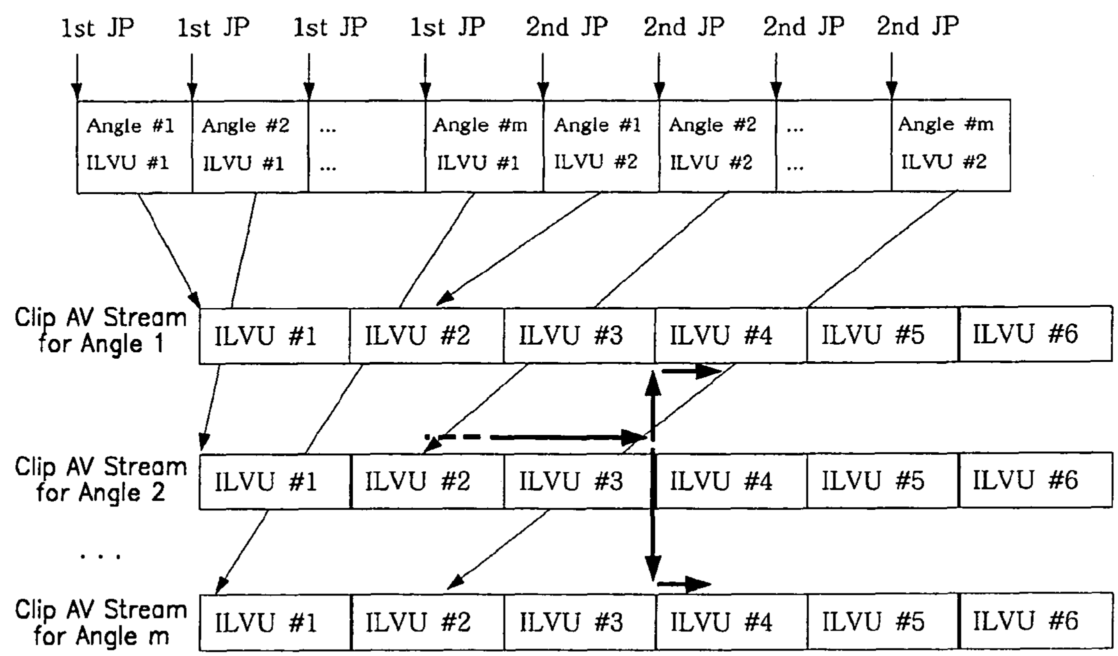
FIG. 13 is a view for describing a method in which respective clip AV streams are interleaved and recorded to illustrate an aspect of the present invention.

FIG. 13 shows a data structure where respective clip AV streams are interleaved and recorded, to illustrate an aspect of the present invention. As shown in FIG. 13, where a clip AV stream, as one angle data, is divided into smaller interleaved units to be interleaved with different angle data, a jumping-unit acts as an interleaved unit, and a start-point of the interleaved unit acts as a jumping-point and simultaneously as a first entry-point of a corresponding interleaved unit. One interleaved unit may comprise a plurality of entry-points for random access. Referring to FIG. 13, there may be a jumping at a certain jumping-point even in the midst of reproducing one angle data. Where clip AV streams are interleaved, an interleaved unit corresponding to current angle data is sought and reproduced. Jumping-point information is used to reproduce a next interleaved unit belonging to, for example, the same angle data, that is, the current angle data, after reproduction of the interleaved unit. The location of the next interleaved unit is found using the jumping-point information. Where a user selects one angle from another angle, in other words, one angle data from another angle data, the jumping point information is also used to search for the location of a corresponding interleaved unit of the one angle data.

Figure 14:
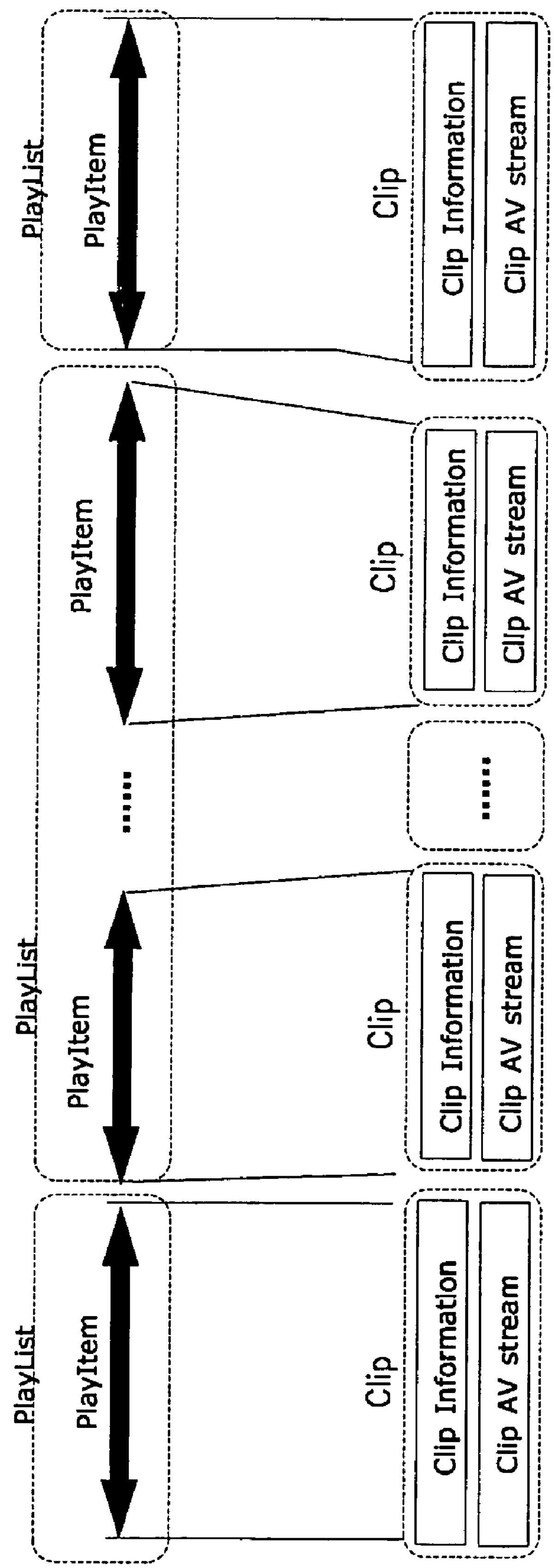
FIG. 14 is a view for describing a correlation among PlayLists, PlayItems, clip information, and clip AV streams to illustrate an aspect of the present invention.

FIG. 14 illustrates a correlation among a PlayList, a PlayItem, clip information, and a clip AV stream. As an illustration, a clip refers to a clip AV stream and corresponding clip information for the clip AV stream. Referring to FIG. 14, a PlayList is a basic unit for reproduction. An information storage medium according to the present invention may store a plurality of PlayLists. One PlayList may comprise a plurality of PlayItems being interconnected. A PlayItem may be used to designate a reproduction start time and reproduction end time of a clip. The location of a corresponding part (PlayItem) in an actual clip AV stream can be found using clip information.

An information storage medium according to the present invention, capable of allowing random access, may perform a successive reproduction by changing reproduction locations in a predetermined time, even in a non-contiguous storage area. This location change is referred to as "jumping." Generally, an electronic information storage medium such as a memory does not require a predetermined jumping time, but an information storage medium such as an optical disk, wherein a pickup is moved to read data, requires a considerable time for a jumping operation. Also, where a reading speed of motion picture data from the information storage medium is different from a reproduction speed of the read motion picture data, a component for compensating the difference between the reading speed and the reproduction speed is needed even in the case of reading and reproducing a contiguous storage area. A motion picture buffer may be used as such a compensating component. A motion picture buffer having a predetermined size is prepared. The buffer is filled by reading data at a predetermined speed, and thereafter, a reproduction is performed. The reading speed of the data may be controlled to prevent overflow or underflow of the motion picture buffer. By using the motion picture buffer, even where the motion picture data is recorded at a variable bit-rate (VBR), a successive reproduction is possible.

Figure 15:
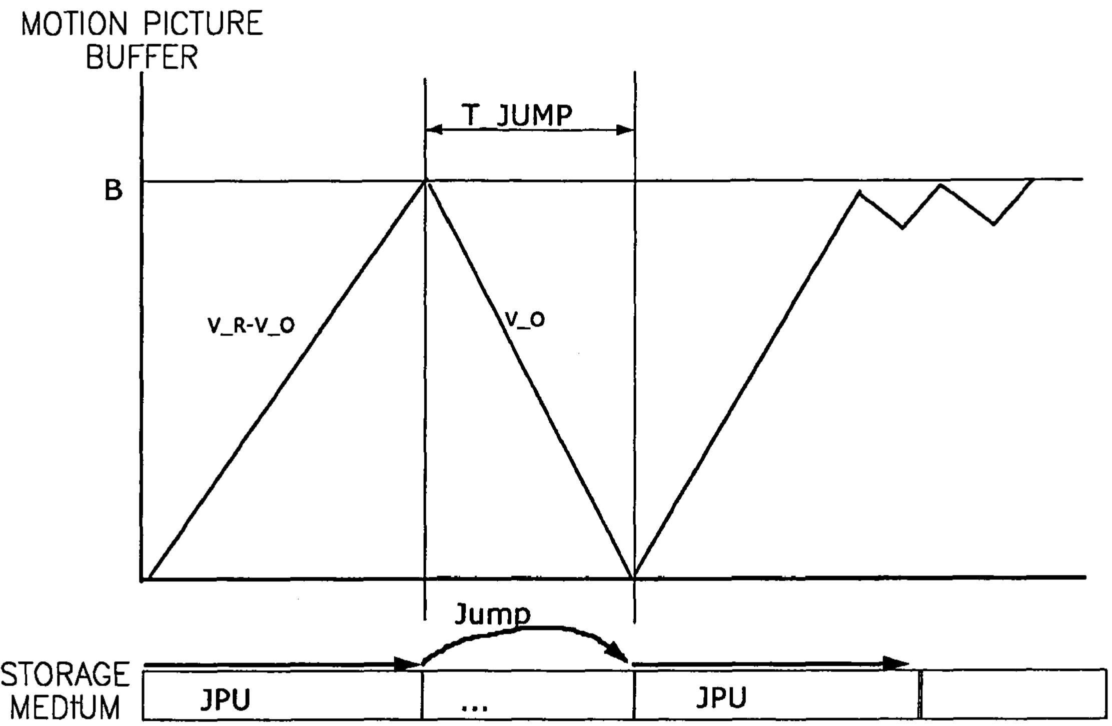
FIG. 15 is a view for describing a relationship between jumping operations and buffers, for successively reproducing motion picture data, to illustrate an aspect of the present invention.

FIG. 15 illustrates that data stored in the motion picture buffer is reproduced in such a manner that, even where a jumping-unit is reproduced and thereafter a jumping is generated to a clip AV stream storing motion picture data for another angle, the motion picture data is reproduced without disconnection during the jumping operation time. Before underflow of the buffer can occur, the jumping operation is completed and a reproduction of a jumping unit of a next angle is started. In the case of a reproduction device requiring a jumping operation time, if it is assumed that a worst jump operation time is T_JUMP, a data reading speed is V_R, and a reproduction speed of motion picture data is V_O, the size of a jumping unit should satisfy the condition: Jumping unit size>V_R*V_O*T_JUMP/(V_R−V_O). Also, the buffer should satisfy at least the following size condition: Buffer size (B)>V_O*T_JUMP.

Figure 16:
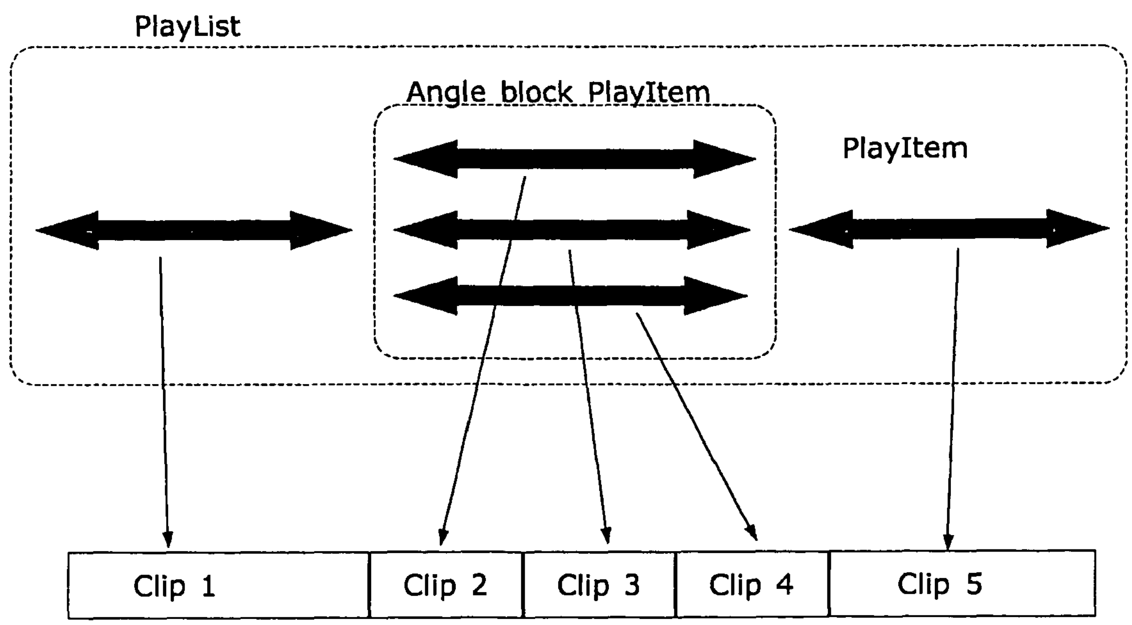
FIG. 16 is a view illustrating an exemplary construction of a PlayList having a multi-angle structure, according to an embodiment of the present invention.

FIG. 16 shows a PlayList having a multi-angle structure according to an embodiment of the present invention. As shown in FIG. 16, PlayItems included in the PlayList have a sequential structure, but as denoted by a second PlayItem in FIG. 16, a plurality of clips forming an angle block correspond to a PlayItem in the case of multi-angle data. Upon reproduction, one of clip AV streams (not shown) belonging to this angle block may be reproduced. The clip AV streams, that is, the clips 2, 3 and 4 forming the angle block may have the same reproduction time. While not illustrated, according to an aspect of the present invention, the clips designated to the PlayItem forming the angle block include jumping-point information as additional information in a separate storage area from that of motion picture data, that is, the clip AV streams. According to various aspects of the present invention, the clip AV streams may be interleaved to each other, or divided and recorded in a contiguous storage area, that is, each of the clip AV streams is recorded continuously without being interleaved with other clip AV streams. Where the clip AV streams are interleaved, each clip AV stream is divided into smaller units, that is, interleaved units, to be interleaved with divided clip AV streams for other angles. In the case of not being interleaved, as shown in FIG. 16, Clips 2, 3, 4 are recorded respectively on a continuous storage area. Accordingly, these clips are provided in the same manner as that of Clips 1 and 5 which do not form the angle block.

Figure 17:
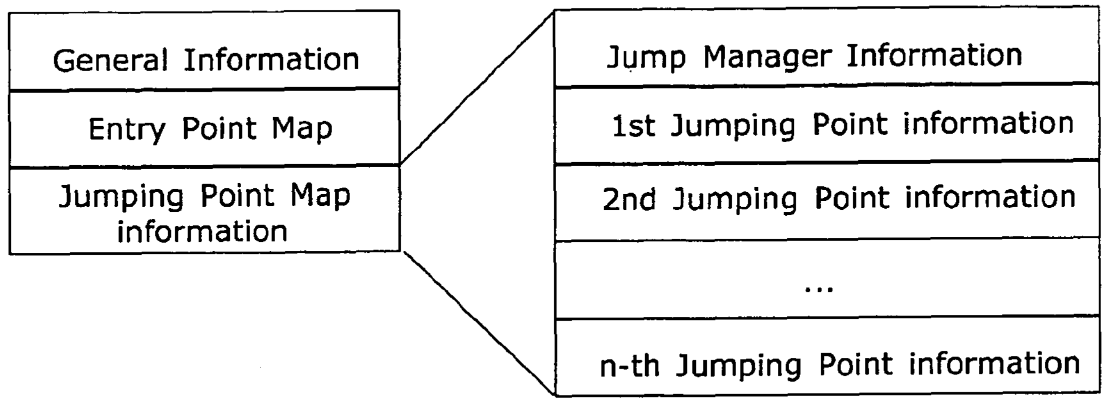
FIG. 17 is a block diagram illustrating a data structure for jumping-points, according to an embodiment of the present invention.

FIG. 17 shows a data structure for providing jumping-points according to an embodiment of the present invention. Referring to FIG. 17, in the case that a corresponding clip is a clip for angle, jumping point map (JPMap) information is created and included in clip information, additionally to general Information and entry point map (EPMap) information. According to an embodiment of the present invention, jumping point information is recorded in a separate storage area from that of motion picture data. According to an aspect, since the jumping point information has a close relationship with the motion picture data, the jumping point information is included in clip information. The clip information is additional information for a clip AV stream. According to various aspects of the present invention, motion picture data for different angles may be represented by a clip AV stream or a plurality of clip AV streams. The general information may comprise information as follows:

- version_number: version of a clip information file;
- EPMap_start_address: relative byte number from a first byte of the clip information file, indicating a start address of an EPMap information;
- JPMap_start_address: relative byte number from a first byte of the clip information file, indicating a start address of a JPMap information, wherein if this value is zero, the corresponding clip is not a clip for angle and the JPMap information does not exist; and
- ClipInfo: storing attributes of a clip AV stream file related to the clip information file.

The EPMap information comprises information for the time and location of an entry point capable of random access. Generally, the reproduction time is a Presentation Time defined in MPEG, and the location information is the number of bytes, the number of sectors, or the number of MPEG-TS packets where motion picture information is encoded in MPEG Transport Streams. The JPMap information comprises jumping point information to virtually connect a clip with clips of other angles where the clip corresponds to a clip for angle data. According to an aspect, the number of jumping-points and corresponding jumping point information are included in jump manager information of the JPMap information. The jumping point information comprises information to seek a location of a jumping point from a start location of a corresponding clip. According to an aspect, this location information is the number of bytes or the number of sectors. According to another aspect, the location information may be the number of MPEG-TS packets where the information is encoded in MPEG Transport Streams.

Figure 18:
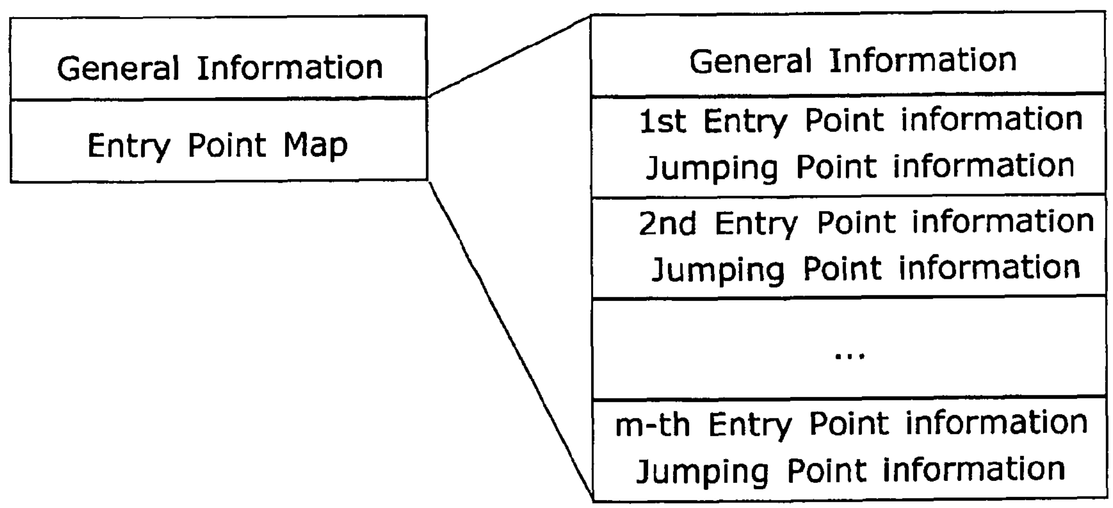
FIG. 18 is a block diagram illustrating a data structure for jumping-points, according to another embodiment of the present invention.

FIG. 18 shows a data structure for providing jumping-points according to another embodiment of the present invention. Referring to FIG. 18, jumping point information is included in EPMap information. As described above, a jumping point may be identical to an entry point as a random access point where a moving picture is encoded by performing space-time compression such as the MPEG. Accordingly, information on jumping points can be easily recorded by inserting information about whether a corresponding entry point acts as a jumping point to information on the entry point. According to an aspect, each of a plurality of clip information corresponding to clip AV streams may include EPMap information comprising information on entry points and whether each of the entry points also acts a jumping point.

Figure 19:
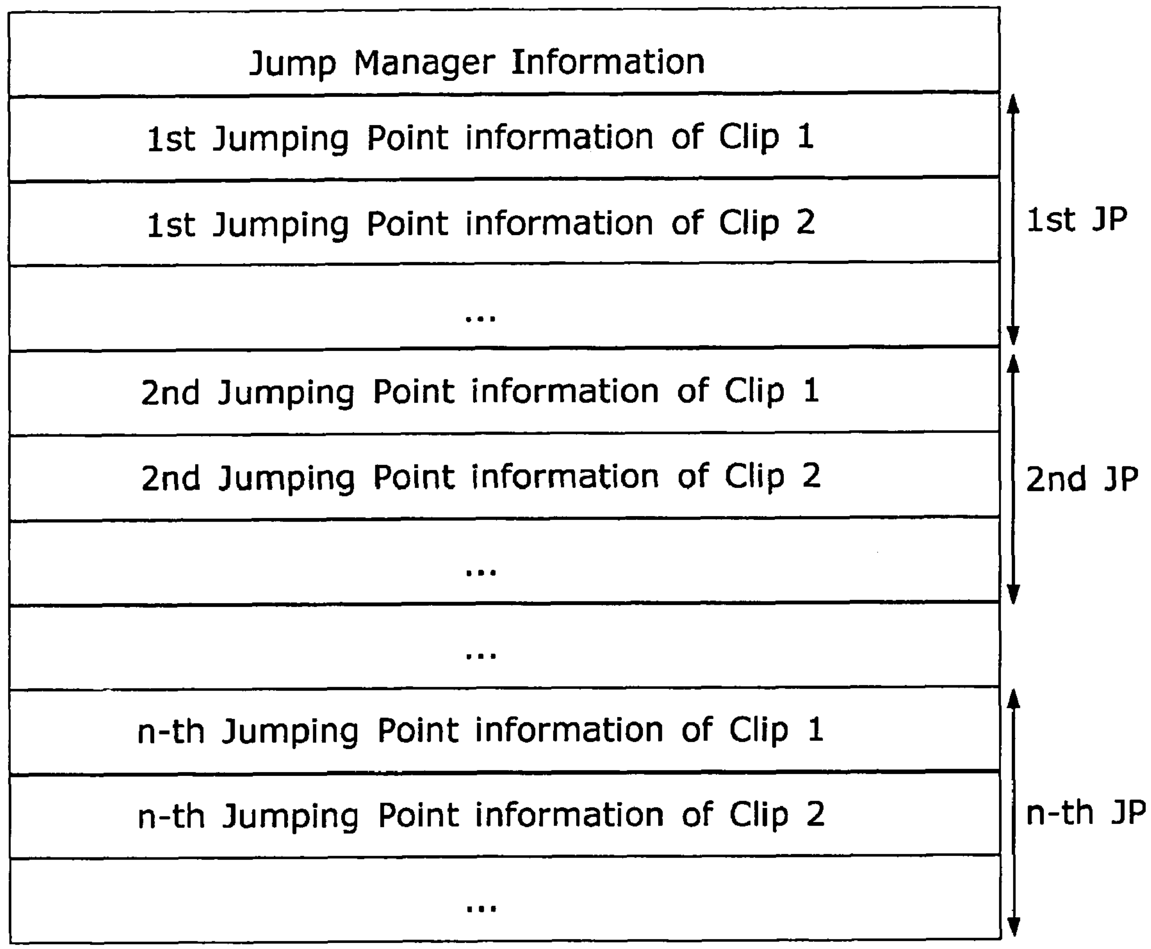
FIG. 19 is a block diagram illustrating a data structure for jumping-points, according to still another embodiment of the present invention.

FIG. 19 shows a data structure for providing jumping points according to still another embodiment of the present invention. Referring to FIG. 19, an additional information structure is created by collecting jumping-point information for clips forming an angle block. That is, the number of clips forming one angle block and the number of jumping-points existing in one clip are stored in jump manager information. Then, information for the jumping-points for each clip, that is, each clip AV stream, is stored sequentially in the jump manager information. A corresponding location of each angle, each angle data, may be searched for with this information structure. According to a different aspect, jumping point map information may correspond to a clip, that is, a clip AV stream corresponding to motion picture data for different angles, that is, various angles.

Figure 20:
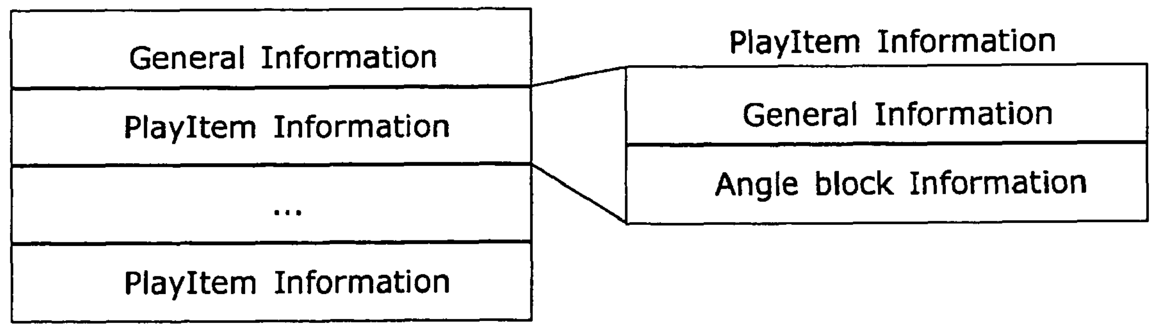
FIG. 20 is a block diagram illustrating an exemplary PlayList information having PlayItems forming an angle block, to illustrate an aspect of the present invention.
Figure 22:
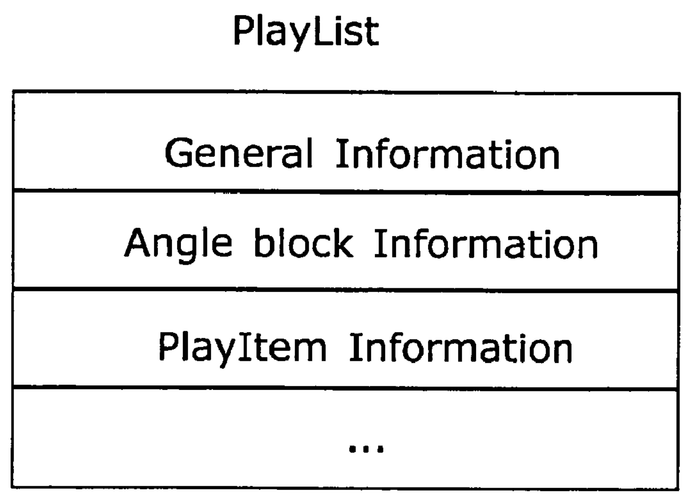
FIG. 22 is a block diagram illustrating an exemplary structure of additional information for an angle represented by a corresponding PlayList, to illustrate an aspect of the present invention.

FIG. 20 shows PlayList information comprising a PlayItem forming an angle block. Referring to FIG. 20, PlayItem information comprises angle block information in addition to general PlayItem information. The angle block information comprises information about whether a corresponding PlayItem constitutes an angle block. The PlayItem information constituting the angle block is recorded in order. Upon reproduction, one of the PlayItems forming the PlayList is reproduced. Where the PlayItem is for multi-angle motion picture data, a change may be provided to reproduce from one angle to another belonging to the same angle block. According to another aspect, FIG. 22 shows PlayList information comprising PlayItems and angle block information.

Figure 21:
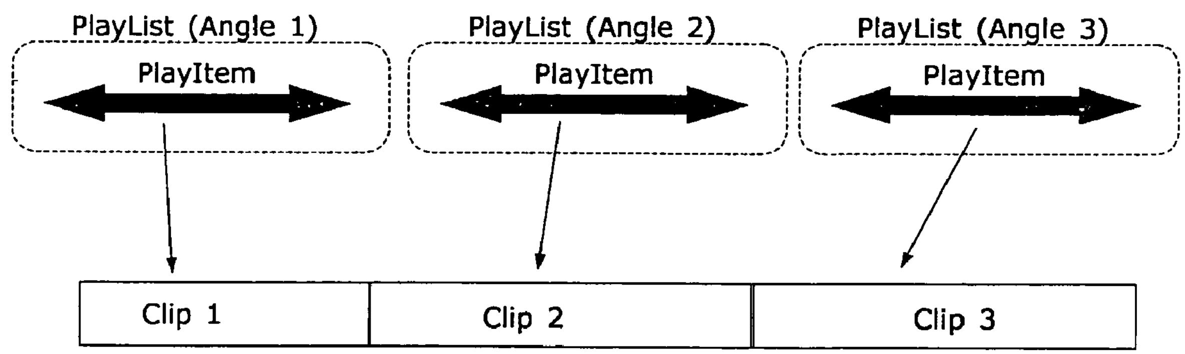
FIG. 21 is a view illustrating an exemplary construction of PlayLists as reproduction units according to respective angles, to illustrate an aspect of the present invention.

FIG. 21 shows a construction of PlayLists as reproducing units corresponding to respective angles. Referring to FIG. 21, where one PlayList corresponds to one angle, the PlayItem belonging to the PlayList does not form an angle block.

As shown in FIG. 21, information on an angle represented by a corresponding PlayList is recorded separately. A corresponding PlayList is reproduced according to an angle selection or angle change by a user.

As described above, motion picture data for one angle may be divided and interleaved with divided motion picture data for another angle, or each motion picture data may be recorded in a continuous storage area. The connection locations of the motion picture data representing respective angles are jumping-points. The jumping-points are managed as additional data in a separate storage area from that of the motion picture data. Reproduction unit information for connecting and reproducing the corresponding recording units for the motion picture data may be provided additionally to information for multi-angles. A reproduction apparatus, according to an embodiment of the present invention, performs the following operation to reproduce multi-angle data.

Since information for jumping points for seeking and reproducing angle data is recorded on a separate storage area from that of motion picture data, before a corresponding motion picture data is reproduced, the information for the jumping points may be read from the information storage medium and stored in a memory. Then, the corresponding angle data is tracked and reproduced, or another corresponding angle data according to an angle change by, for example, a user is tracked and reproduced. According to an aspect, clip information comprises jumping information as connection information for motion picture data forming an angle block. Accordingly, where an angle change is requested at a specific time-point, after a reproduction is performed up to a nearest jumping point of the data being reproduced, remaining motion picture information following a corresponding jumping point of motion picture data for another angle is reproduced.

Where the respective angle data are not interleaved, and recorded in a contiguous storage space, even though data is multi-angle motion picture data, the data is read and reproduced from the contiguous storage space where an angle change is not performed. Therefore, the multi-angle motion picture data may be encoded like general motion picture data, for example, single-angle motion picture data. Accordingly, separate data or encoding limitation for successively reproducing an angle, as in interleaving, is not required in this aspect.

As an information structure of a reproduction unit, where information representing multi-angles is recorded in a manner that a PlayItem belonging to a PlayList constitute an angle block, and where an angle change is requested while a clip AV stream belonging to the angle block is reproduced, after reproducing up to a nearest jump-point from the current location of the clip AV stream for an angle being reproduced, reproduction continues from a point after a corresponding jumping-point of another clip AV stream for another angle, the angle change being requested from the angle (current angle) to the another angle by, for example, a user. Referring to FIG. 21, where separate PlayLists for respective angles are provided, when an angle change is requested while a current PlayList is reproduced, another PlayList is reproduced according to the change.

A recording apparatus according to an embodiment of the present invention is an apparatus for recording the above-described clip AV stream, jumping point information, and reproduction unit information, in an information storage medium. A method of recording using the recording apparatus, according to an embodiment of the present invention is as follows.

Considering a reading speed V_R, a jumping time T_JUMP of a reproduction apparatus, and a maximum bit-rate V_O of moving picture data, a size of a jumping unit is determined. The relationship used to determine the size of the jumping unit is described above. The determined jumping unit size is converted into a reproduction time. Then, respective motion pictures are encoded so as to have random access points be created into units, each that is equal to or more than this reproduction time. Boundary locations of these units are used as jumping-points. For example, in a space-time compression method such as the MPEG, a random access point is a start point of a GOP (Group Of Picture). Accordingly, the jumping unit comprises a plurality of GOPs. The jumping point may be made at a same reproduction time for each motion picture.

The encoded motion picture data is interleaved by using the jumping unit as an interleaved unit, or recorded in a contiguous storage area of the information storage medium according to each angle thereof. The determined location information for the jumping-points is recorded as additional information. According to an aspect of the present invention, information on jumping points corresponding to respective clip AV streams may be recorded in clip information.

Thereafter, information on reproduction units forming multi-angle data is created and recorded. At this time, a PlayItem that corresponds to clips are created to form an angle block. According to an aspect, these angle blocks are interconnected to create a PlayList. According to another aspect, an independent PlayList for each angle may be created.

As described above, according to the present invention, jumping point information is recorded in a separate storage area from that of motion picture data. Motion picture data for one angle may be interleaved with motion picture data for another angle, or motion picture data for multi-angle data may be individually recorded in a contiguous storage area. Accordingly, an effective distribution of recording area and random access is obtained. This also enables more efficient tracking and reading of multi-angle motion picture data.

It is understood that a system which uses the present invention also includes permanent or removable storage, such as magnetic and optical discs, random-access memory (RAM), read-only memory (ROM), etc., on which the process and data structures of the present invention can be stored and distributed. The operations can also be distributed via computer data signals, for example, downloading over a network such as the Internet.

It is also understood that while the present invention has been illustrated in part by describing a DVD, it is understood that the present invention is not limited thereto and may be applied with respect to a variety of information storage media known or to be known.

It is further understood that while illustrative, non-limiting embodiments of the present invention overcome the above disadvantages and other disadvantages not described above, the present invention is not required to overcome the disadvantages described above, and illustrative, non-limiting embodiments of the present invention may not overcome any of the problems described above.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A non-transitory information storage medium for use in a recording and/or reproducing apparatus, the non-transitory information storage medium storing multi-angle motion picture data corresponding to a motion picture, the medium comprising:

clip audio-video (AV) streams corresponding to motion picture data for different angles;

clip information corresponding to the clip AV streams, each unit of the clip information comprising:

one of the clip AV streams for random access by the apparatus; and information on whether each of the entry points is an angle change point through which the motion picture is reproduced by the apparatus from one angle to another angle; and playlist information comprising at least one playitem corresponding to the clip AV streams, wherein the clip information is provided in a separate area from that of the motion picture data.

2. The medium according to claim 1, wherein the information on whether each of the entry points is an angle change point comprises location information of the entry points among the AV stream.

3. The medium according to claim 1, wherein the clip AV streams corresponding to motion picture data for different angles are interleaved with respect to each other.

4. The medium according to claim 3, wherein the angle change points correspond to boundaries of interleaved units of the interleaved motion picture data.

5. The medium according to claim 3, further comprising playlist information comprising at least one playitem having angle block information, the angle block information comprising information on whether the playitem is for the motion picture data for different angles.

6. The medium according to claim 5, wherein the angle block information further comprises information on a number of different angles for the motion picture.

7. An apparatus for reproducing motion picture data for different angles corresponding to a motion picture from an information storage medium, the apparatus comprising:

a reading unit configured to read clip AV streams corresponding to the motion picture data for different angles, the clip AV streams being interleaved with respect to each other, from the information storage medium; and a reproduction unit configured to reproduce:

the clip AV streams according to clip information corresponding to the clip AV streams provided in a separate area of the information storage medium from that of the interleaved clip AV streams; and playlist information comprising at least one playitem corresponding to the clip AV streams, wherein each unit of clip information comprising an entry point map comprising information on entry points of a corresponding one of the clip AV streams for random access and information on whether each of the entry points is an angle change point, the angle change point being a point through which the option picture is reproduced from one angle to another angle.

8. The apparatus according to claim 7, wherein the information on whether each of the entry points is an angle change point comprises location information of the entry points among the AV stream.

* * * * *

UNITED STATES PATENT AND TRADEMARK OFFICE

CERTIFICATE OF CORRECTION

PATENT NO. : 7,764,864 B2
APPLICATION NO. : 10/735819
DATED : July 27, 2010
INVENTOR(S) : Kil-soo Jung et al.

It is certified that error appears in the above-identified patent and that said Letters Patent is hereby corrected as shown below:

Claim 1, line 10 (col. 13, ln. 8), insert --an entry point map comprising information on entry points of a corresponding-- before “one of the clip AV streams”.

Signed and Sealed this

Twenty-sixth Day of October, 2010

David J. Kappos
*Director of the United States Patent and Trademark Office*